(12) United States Patent
Keen

(10) Patent No.: US 7,726,142 B2
(45) Date of Patent: Jun. 1, 2010

(54) LOW PROFILE HVAC SYSTEM

(75) Inventor: Eric Albert Keen, Manhattan, KS (US)

(73) Assignee: Deere & Company, Moline, IL (US)

( * ) Notice: Subject to any disclaimer, the term of this patent is extended or adjusted under 35 U.S.C. 154(b) by 783 days.

(21) Appl. No.: 11/518,050

(22) Filed: Sep. 8, 2006

(65) Prior Publication Data

US 2008/0060798 A1    Mar. 13, 2008

(51) Int. Cl.
*B60H 1/32* (2006.01)
*B60H 1/00* (2006.01)
*B60H 3/00* (2006.01)

(52) U.S. Cl. ............. 62/244; 62/239; 454/139; 165/202; 165/42

(58) Field of Classification Search .............. 62/244, 62/239, 259.1; 165/202, 42; 236/49.3; 454/139, 454/128, 136
See application file for complete search history.

(56) References Cited

U.S. PATENT DOCUMENTS

| | | | |
|---|---|---|---|
| 2,475,841 A | 7/1949 | Jones | |
| 3,370,645 A | 2/1968 | Wingen | |
| 3,532,377 A | 10/1970 | Grasseler | |
| 4,622,831 A * | 11/1986 | Grupa | 62/244 |
| 4,641,502 A | 2/1987 | Aldrich et al. | |
| 6,357,249 B1 | 3/2002 | Robinson et al. | |
| 6,780,097 B2 | 8/2004 | Shuttleworth et al. | |

FOREIGN PATENT DOCUMENTS

| | | | |
|---|---|---|---|
| DE | 4037133 | | 5/1992 |
| DE | 4037133 A1 | * | 5/1992 |
| DE | 4037622 | | 6/1992 |
| DE | 4109127 | | 9/1992 |
| DE | 202005000560 | | 5/2006 |
| EP | 0036213 | | 9/1981 |
| GB | 2201767 A | * | 9/1988 |

* cited by examiner

*Primary Examiner*—Chen-Wen Jiang

(57) ABSTRACT

There is a need for a compact and high capacity HVAC system for a vehicle cab. This need is met by a roof enclosed HVAC system. The system includes a roof upper panel, a roof lower panel, a fresh air duct communicated with a fresh air inlet exposed to an exterior of the cab, a recirculation air duct communicated with a recirculation air inlet exposed to an interior of the cab, and a conditioned air duct communicated with an air outlet exposed to the interior of the cab. An HVAC unit is mounted between the roof upper and lower panels. The HVAC unit includes a fan unit, a heater unit and an evaporator unit. The heater and evaporator units are concentrically arranged around and surrounding the fan unit. The fan unit draws air from the fresh air duct and the recirculation air duct and blows air through the heater unit and an evaporator unit and into conditioned air ducts

5 Claims, 4 Drawing Sheets

LOW PROFILE HVAC SYSTEM

BACKGROUND

The present invention relates to a heating, ventilation and air conditioning (HVAC) system for a vehicle cab.

Operator stations or cabs of most agricultural vehicles are surrounded by large areas of glass so that the operator can see the area being worked or the product being produced or harvested. These large glass surface areas transmit a lot of light and result in a significant solar heat load being applied through the glass surfaces into the cab. The large glass area can result in solar loading of a vehicle cabin similar to a mid-size home load with significantly greater floor square footage.

This solar heat load must be overcome by the air conditioning system in order to provide an acceptable level of comfort to the operator, and this is usually accomplished via spot cooling of the operator only, rather than cooling the entire space. Most vehicle air conditioning systems in use today have large heat rejection capacities in order to handle the large solar heat loads combined with heat loads from the vehicle engine and drive train, over which the cab is placed.

Because of the vehicle must operate in a dirty, debris-laden air, this large heat rejection capacity requires a large spacing between the fins of the heat exchanger cores to prevent them from being clogged with airborne debris, and this results in a rather large HVAC system. It is difficult to fit such large HVAC system into a vehicle or cab, and if a large enough system cannot be accommodated, then the cab designer may be forced to use a smaller HVAC system which may only be large enough to spot cool the operator. However, spot cooling is undesirable because it can result in over-cooling of portions of an operator's body, while insufficiently cooling anyone else who is in the operator's compartment.

To minimize the packaging impact to the performance to the vehicle or operator, traditionally, long thin heat exchanger cores have been used. However, these long, thin cores make heat transfer to the air flowing through them difficult to uniformly transfer heat between the air and the entire face area of the core due to the poor aspect ratio of the core faces to the fans used to push or pull air through the cores. This air-side heat transfer inefficiency resulted in core with even larger theoretical capacities and thus space requirements in order to obtain the required capacities increase even further.

SUMMARY

Accordingly, an object of this invention is to provide a compact HVAC system for a vehicle operator station.

A further object of the invention is to provide such an HVAC system which is capable of cooling or conditioning an entire operator station.

These and other objects are achieved by the present invention, wherein a roof enclosed HVAC system is provided for a vehicle cab. The system includes a roof upper panel, a roof lower panel, a fresh air duct communicated with a fresh air inlet exposed to an exterior of the cab, a recirculation air duct communicated with a recirculation air inlet exposed to an interior of the cab, and a conditioned air duct communicated with an air outlet exposed to the interior of the cab. An HVAC unit is mounted between the roof upper and lower panels. The HVAC unit includes a fan unit, a heater unit and an evaporator unit. The heater and evaporator units are concentrically arranged around and surrounding the fan unit. The fan unit has an annular impeller driven by a motor mounted in the center of the impeller. The impeller has an annular upper wall, an annular lower wall surrounding an inlet chamber, and a plurality of impeller blades extending between the upper and lower walls. The blades force air radially outwardly upon rotation of the fan unit, and the fresh air duct and the recirculation air duct are communicated with the inlet chamber. The conditioned air duct receives air forced outwardly by the fan unit through the heater unit and the evaporator unit.

This provides a high heat rejection capacity HVAC fan and heat exchanger module in a very compact overall package size that allows great flexibility in placement around/in the operator station. Use of an impeller with a single motor allows enough air flow to be moved through the heat exchangers to achieve the desired thermal capacity while contained within the heat exchanger core size.

DETAILED DESCRIPTION

Figure 1:
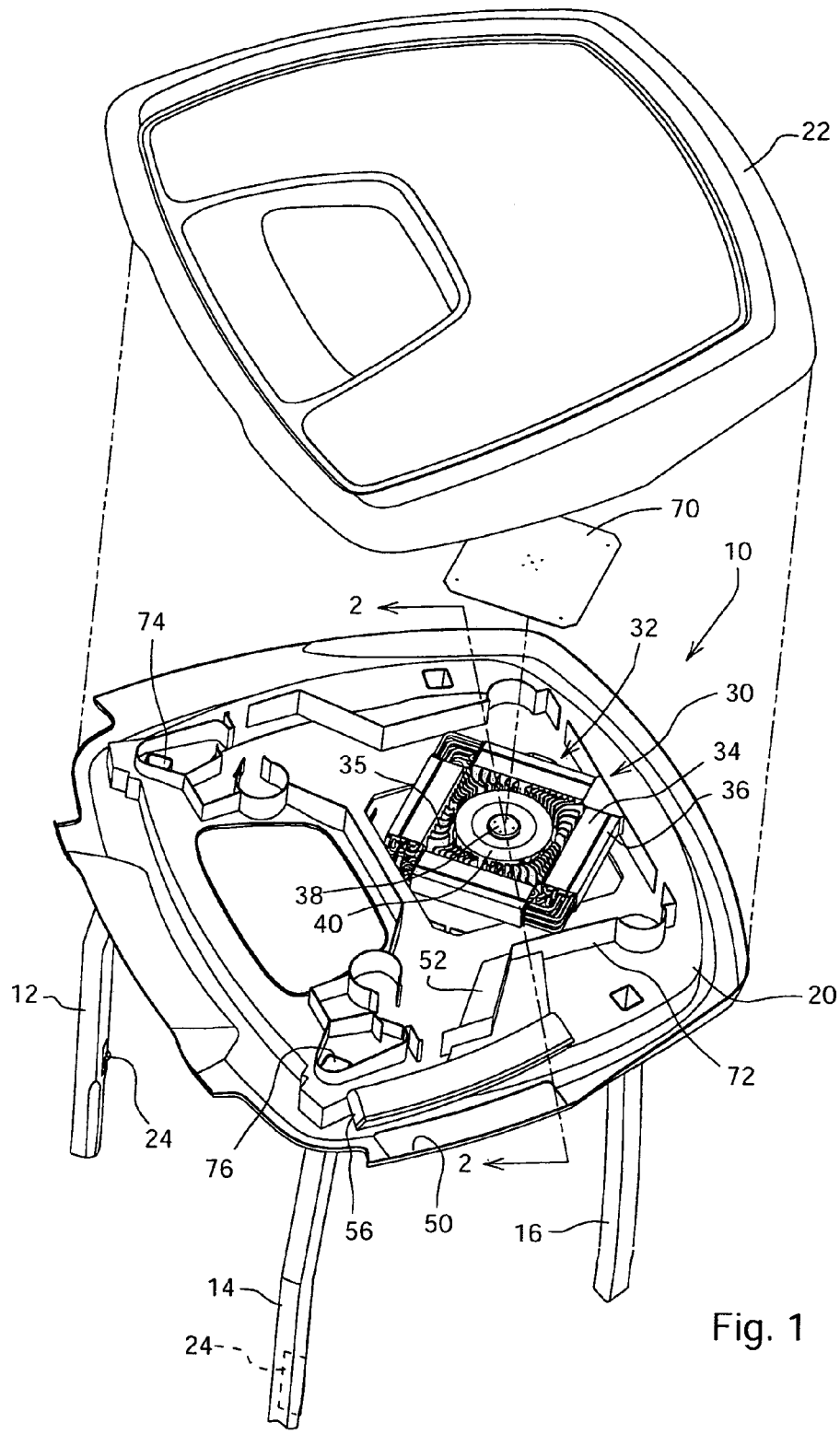
FIG. 1 is a partially exploded perspective view of a roof-enclosed HVAC system according to the present invention.
Figure 2:
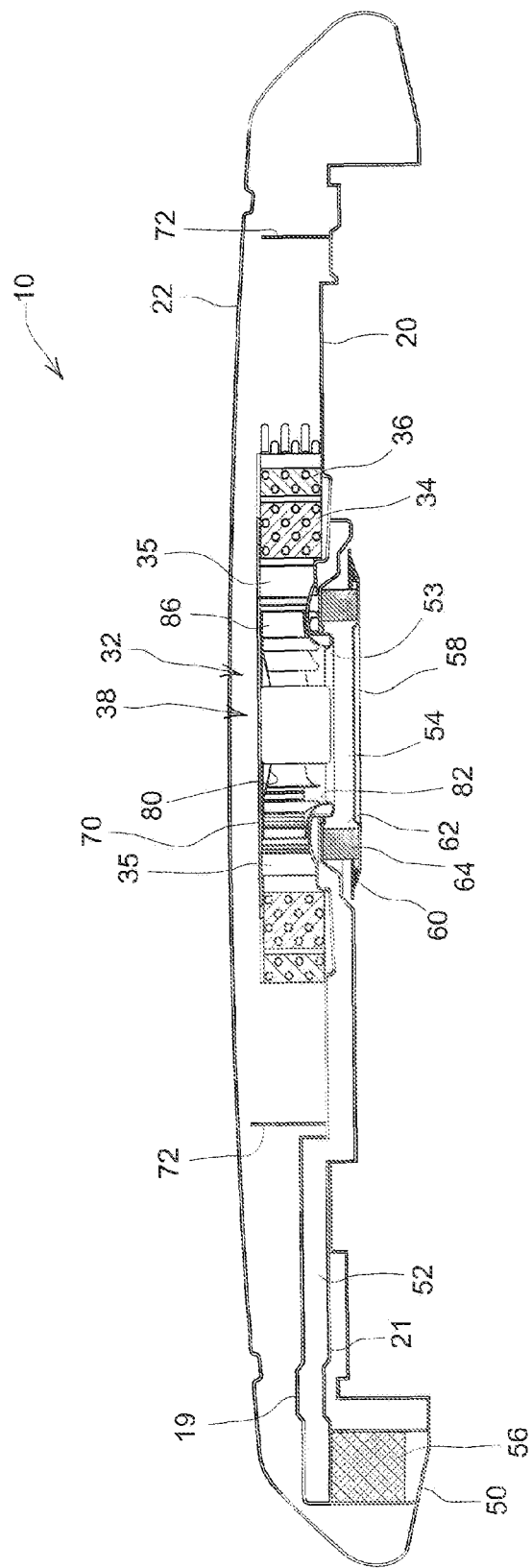
FIG. 2 is a sectional view taken along lines 2-2 of FIG. 1.

Referring to FIGS. 1 and 2, a roof-enclosed heating, ventilation and cooling (HVAC) system 10 is mounted on four hollow vehicle cab corner posts, although only corner posts 12-16 are visible in FIG. 1. The roof includes a lower or inner roof panel 20 and an outer or upper roof panel 22. Corner posts 12 and 14 include air outlets 24 which communicate conditioned air into the interior of a vehicle cab which is enclosed by panels, windows and doors (not shown) which extend between the corner posts.

An HVAC assembly 30 is enclosed between the roof panels 20 and 22. HVAC assembly 30 includes a central fan unit 32 surrounded by an evaporator or cooling unit or core 34 and a heater core 36. A plurality of fins 35 extend generally radially between fan unit 32 ad core 34. Fan unit 32 includes a central fan motor 38 mounted to and in the center of an impeller unit 40.

As best seen in FIG. 2, a pair of inner housing panels 19 and 21 form a fresh air inlet 50. Panels 19, 21 and 20 form a fresh air duct 52 which communicates inlet 50 with an inlet chamber 54 formed below the fan unit 32. A fresh air filter 56 is mounted in the duct 52 near the inlet 50.

Panel 20 and a lower cover 58 form a recirculation air inlet 60 and a recirculation air duct 62 which communicates inlet 60 to inlet chamber 54. An annular recirculation air filter 64 is mounted in the duct 62 near the inlet 60 and is held in place by the cover 58. Panel 19 forms a curled annular lip 53 which surrounds the inlet chamber 54.

An upper cover plate 70 is fixed to the upper panel 22 or to posts (not shown) which project from the panel 20. Cover plate 70 covers both cores 34 and 36 so that air from fan unit 32 is forced to flow through cores 34 and 36. Preferably, the non-rotating part of motor 38 is attached to the bottom surface of plate 70. A wall 72 surrounds the HVAC unit 30 and channels conditioned air out through vents 74 and 76, and down into the corner posts 12 and 14.

Figure 3:
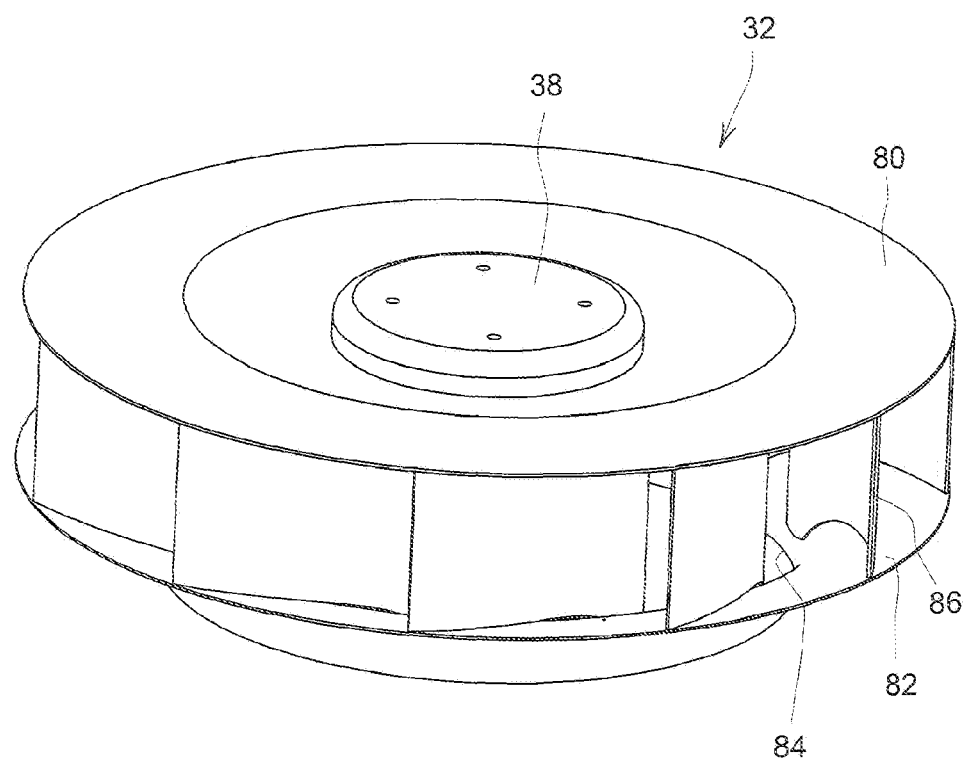
FIG. 3 is a perspective view of the fan unit of FIG. 1.
Figure 4:
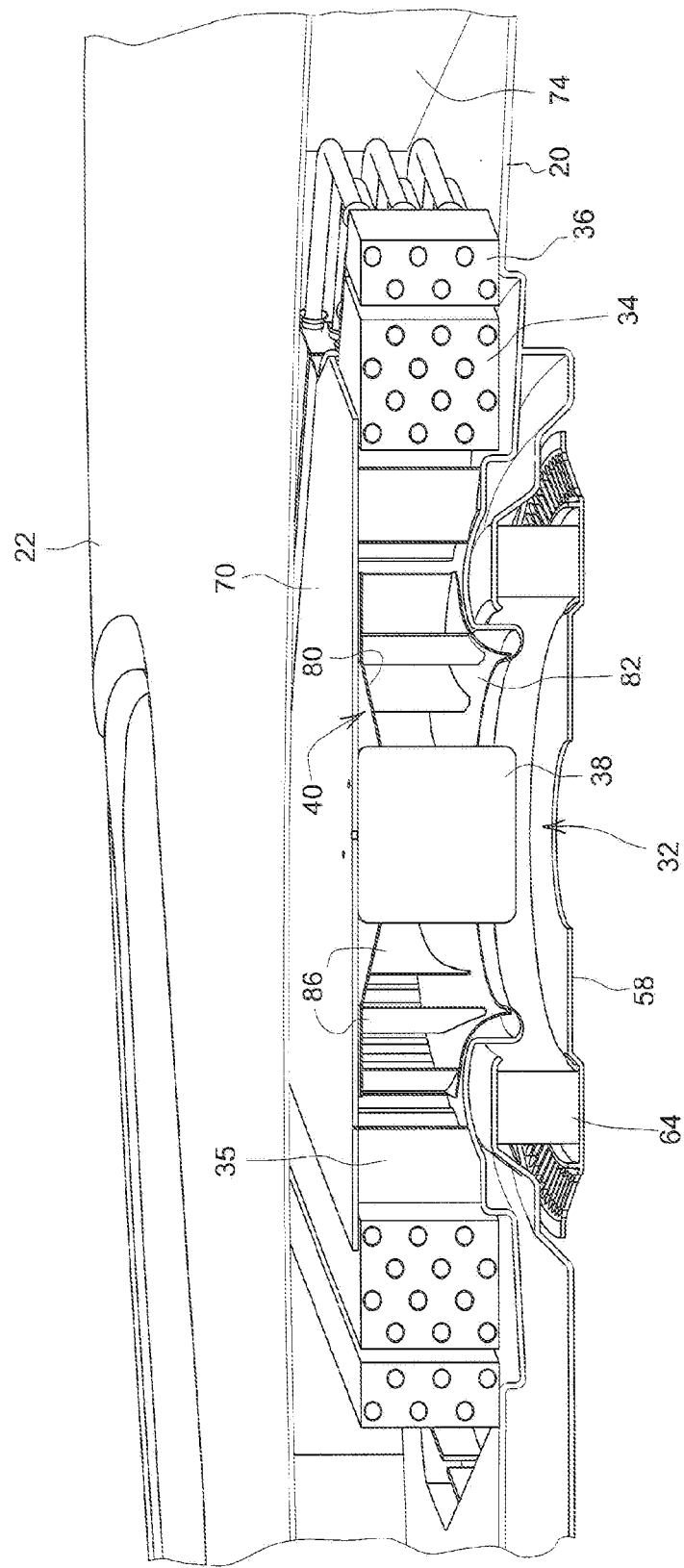
FIG. 4 is an enlarged perspective view of a portion of FIG. 2.

Referring now to FIG. 3, the fan unit 32 has circular upper plate 80 with an inner edge which is attached to a rotating outer surface of the motor 38. Fan unit 32 also has a circular annular lower plate 82 which surrounds an opening 84 which is open to the inlet chamber 54. Fan unit 32 also includes a plurality of curved blades 86 which extend between plates 80 and 82.

As a result, the rotating fan unit 32 pulls fresh air and recirculation air into chamber 54 through ducts 52 and 62, respectively, and then the blades 86 force the air from chamber 54 outwardly between plats 80 and 82, through fins 35 and through evaporator 34 and heater 36, and then to vents 72 and 74 and down into the vehicle cab (not shown) through corner posts 12 and 14.

The result is a vehicle HVAC system with heat exchanger surface areas large enough to condition the entire cab or operator station without spot cooling of an operator. The heat exchanger cores 34 and 36 can be either circular, semi-circular, square, hexagonal, or any other reasonable geometrically near symmetric pattern. The centrally located fan unit can either push or pull air through the heat exchanger cores. But, preferably, the fan unit pushes the air through the heat exchangers 34 and 36 to prevent heat from transferring from the fan motor 38 after it is conditioned in the heat exchangers 34 and 36. This permits a more precise control over the conditioning because the heat imparted from the fan motor 38 can be counter-acted by the heat exchangers. Cores arranged in this fashion can result in a significantly large face area and correspondingly large heat rejection capacity in a compact package which can be enclosed within the roof or floor of the operator station. The ductwork can be entirely contained within the height of the heat exchanger cores, and this system allows for a more symmetric, uniform distribution of the conditioned air into the operator station environment.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A roof enclosed HVAC system for a vehicle cab, comprising:
    a roof upper panel;
    a roof lower panel;
    a fresh air duct communicated with a fresh air inlet exposed to an exterior of the cab;
    a recirculation air duct communicated with a recirculation air inlet exposed to an interior of the cab;
    a conditioned air duct communicated with an air outlet exposed to the interior of the cab;
    an HVAC unit mounted between the roof upper and lower panels, the HVAC unit comprising a fan unit, a heater unit and an evaporator unit, the heater and evaporator units being concentrically arranged around and surrounding the fan unit;
    the fan unit comprising an annular impeller driven by a motor mounted in the center of the impeller, the impeller having an annular upper wall, an annular lower wall surrounding an inlet chamber, and a plurality of impeller blades extending between the upper and lower walls, the blades forcing air radially outwardly upon rotation of the fan unit, the fresh air duct and the recirculation air duct being communicated with the inlet chamber, and the conditioned air duct receiving air forced outwardly by the fan unit through the heater unit and the evaporator unit;
    the roof lower panel having a central opening therein, and the fan unit is positioned adjacent said central opening;
    a cover panel is mounted adjacent to the central opening, and an outer portion of the cover panel and an inner portion of the roof lower panel forming a portion of the recirculation duct; and
    a recirculation filter is mounted in the recirculation duct between the cover panel and the roof lower panel.

2. The HVAC system of claim 1, wherein:
    the cover panel covers the central opening, and is spaced apart from the roof lower panel.

3. The HVAC system of claim 2, wherein:
    the recirculation filter is annular.

4. The HVAC system of claim 1, further comprising:
    a roof inner panel located between the roof upper and lower panels, the roof inner panel and a portion of the roof lower panel forming a portion of the fresh air duct.

5. A roof enclosed HVAC system for a vehicle cab, comprising:
    a roof upper panel;
    a roof lower panel;
    a fresh air duct communicated with a fresh air inlet exposed to an exterior of the cab;
    a recirculation air duct communicated with a recirculation air inlet exposed to an interior of the cab;
    a conditioned air duct communicated with an air outlet exposed to the interior of the cab;
    an HVAC unit mounted between the roof upper and lower panels;
    the roof lower panel having a central opening therein, and the HVAC unit is positioned adjacent said central opening;
    a cover panel mounted below adjacent to the central opening and spaced apart from the roof lower panel, and an outer portion of the cover panel and an inner portion of the roof lower panel forming a portion of the recirculation duct; and
    an annular recirculation filter mounted in the recirculation duct between the cover panel and the roof lower panel.

* * * * *